United States Patent
Liu et al.

(10) Patent No.: US 11,403,200 B2
(45) Date of Patent: Aug. 2, 2022

(54) PROVISIONING RESOURCES FOR MONITORING HOSTS BASED ON DEFINED FUNCTIONALITIES OF HOSTS

(71) Applicant: Cisco Technology, Inc., San Jose, CA (US)

(72) Inventors: Xin Liu, San Mateo, CA (US); Sunil Gupta, Milpitas, CA (US); Thanh Trung Ngo, Menlo Park, CA (US); Xuan Loc Bui, Sunnyvale, CA (US); Hoang Viet Nguyen, Pleasanton, CA (US); Shashi Gandham, Fremont, CA (US); Navindra Yadav, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 16/899,290

(22) Filed: Jun. 11, 2020

(65) Prior Publication Data
US 2021/0389877 A1 Dec. 16, 2021

(51) Int. Cl.
G06F 11/34 (2006.01)
(52) U.S. Cl.
CPC ...... *G06F 11/3409* (2013.01); *G06F 2201/84* (2013.01)
(58) Field of Classification Search
CPC .................. G06F 11/3409; G06F 2201/84
See application file for complete search history.

(56) References Cited

U.S. PATENT DOCUMENTS

| | | | |
|---|---|---|---|
| 9,286,182 B2 | 3/2016 | Fries et al. | |
| 9,424,154 B2 | 8/2016 | Bhargava et al. | |
| 9,442,937 B2 | 9/2016 | Chelur et al. | |
| 10,572,412 B1 | 2/2020 | Ward, Jr. et al. | |
| 2007/0169049 A1* | 7/2007 | Gingell | G06F 8/61 717/151 |
| 2010/0299554 A1* | 11/2010 | O'Sullivan | G06F 11/004 709/224 |

(Continued)

OTHER PUBLICATIONS

International Search Report and Written Opinion from the International Searching Authority, dated Oct. 4, 2021, 12 pages, for corresponding International Patent Application No. PCT/US2021/036346.

*Primary Examiner* — Benjamin C Wu
(74) *Attorney, Agent, or Firm* — Polsinelli PC (57) ABSTRACT

Systems, methods, and computer-readable for defining host functionalities in a computing environment include obtaining two or more snapshots comprising information pertaining to two or more processes executing in two or more hosts, the two or more snapshots being obtained at two or more points in time from the two or more hosts. One or more long-running processes amongst the two or more processes are identified based on one or more criteria associated with long-running processes. One or more priorities associated with the one or more long-running processes and used for defining functionalities for at least a subset of the two or more hosts, where high priorities are assigned to long-running processes, such as web server or database server processes, which are unique to at least the subset of the two or more hosts. Resources may be provisioned based on these host functionalities.

20 Claims, 6 Drawing Sheets

(56) References Cited

U.S. PATENT DOCUMENTS

| | | | |
|---|---|---|---|
| 2011/0016381 A1* | 1/2011 | Cahill | G06F 11/3017 |
| | | | 718/100 |
| 2012/0102493 A1* | 4/2012 | Allen | G06F 9/4881 |
| | | | 718/101 |
| 2014/0068040 A1 | 3/2014 | Neti et al. | |
| 2015/0227355 A1* | 8/2015 | Tripoli | G06F 8/63 |
| | | | 717/175 |
| 2016/0352591 A1 | 12/2016 | Sasturkar et al. | |
| 2016/0359891 A1 | 12/2016 | Pang et al. | |
| 2017/0371748 A1* | 12/2017 | Levy | G06F 16/2308 |
| 2018/0322019 A1* | 11/2018 | Stowell | G06F 9/4843 |
| 2021/0255770 A1* | 8/2021 | Benke | G06F 11/3495 |

* cited by examiner

PROVISIONING RESOURCES FOR MONITORING HOSTS BASED ON DEFINED FUNCTIONALITIES OF HOSTS

TECHNICAL FIELD

The subject matter of this disclosure relates in general to the field of provisioning resources for computing systems. More particularly, example aspects are directed to identifying functionalities of computer system hosts based on characterizing processes executing on the hosts, and providing monitoring and security to the hosts based on their identified functionalities.

BACKGROUND

Data centers, server farms, cloud computing systems, and the like may involve several computer systems for hosting applications and addressing various computing needs. For example, various applications may be executing on different servers or hosts in a data center. Understanding how each individual application behaves and the interactivity among applications is important for data center management and growth. Monitoring the various hosts and providing resources such as security services becomes challenging as the number of applications and hosts continue to grow.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for defining host functionalities in a computing environment include obtaining two or more snapshots comprising information pertaining to two or more processes executing in two or more hosts, the two or more snapshots being obtained at two or more points in time from the two or more hosts. One or more long-running processes amongst the two or more processes are identified based on one or more criteria associated with long-running processes. One or more priorities associated with the one or more long-running processes and used for defining functionalities for at least a subset of the two or more hosts, where high priorities are assigned to long-running processes, such as web server process or database server processes, which are unique to at least the subset of the two or more hosts. Resources may be provisioned based on these host functionalities.

In some examples, a method is provided. The method includes obtaining two or more snapshots comprising information pertaining to two or more processes executing in two or more hosts, the two or more snapshots being obtained at two or more points in time from the two or more hosts; identifying one or more long-running processes amongst the two or more processes based on one or more criteria associated with long-running processes; determining one or more priorities associated with the one or more long-running processes; and defining functionalities for at least a subset of the two or more hosts based on the one or more priorities.

In some examples, a system is provided. The system, comprises one or more processors; and a non-transitory computer-readable storage medium containing instructions which, when executed on the one or more processors, cause the one or more processors to perform operations including: obtaining two or more snapshots comprising information pertaining to two or more processes executing in two or more hosts, the two or more snapshots being obtained at two or more points in time from the two or more hosts; identifying one or more long-running processes amongst the two or more processes based on one or more criteria associated with long-running processes; determining one or more priorities associated with the one or more long-running processes; and defining functionalities for at least a subset of the two or more hosts based on the one or more priorities.

In some examples, a non-transitory machine-readable storage medium is provided, including instructions configured to cause a data processing apparatus to perform operations including: obtaining two or more snapshots comprising information pertaining to two or more processes executing in two or more hosts, the two or more snapshots being obtained at two or more points in time from the two or more hosts; identifying one or more long-running processes amongst the two or more processes based on one or more criteria associated with long-running processes; determining one or more priorities associated with the one or more long-running processes; and defining functionalities for at least a subset of the two or more hosts based on the one or more priorities.

In some examples, the one or more criteria associated with long-running processes comprise: an uptime for a process exceeding a predefined threshold.

In some examples, the one or more criteria associated with long-running processes comprise: a command string and file hash for a process matching a command string and file hash of a known long-running process.

In some examples, the one or more criteria associated with long-running processes comprise: a process appearing in a predefined number of consecutive snapshots of the two or more snapshots obtained at two or more points in time from a host of the two or more hosts.

In some examples, determining one or more priorities associated with the one or more long-running processes comprises: determining a subset of the one or more long-running processes as being unique to at least the subset of the two or more hosts; assigning high priority to the subset of the one or more long-running processes; and assigning low priority to remaining long-running processes of the one or more long-running processes which do not belong to the subset of the one or more long-running processes.

In some examples, determining the subset of the one or more long-running processes as being unique to at least the subset of the two or more hosts comprises: performing a weighted term frequency-inverse document frequency (TF-IDF) analysis on the two or more snapshots.

Some examples, further comprise provisioning resources for monitoring at least the subset of the two or more hosts based on defining functionalities for at least the subset of the two or more hosts.

In some examples, the one or more long-running processes comprise one or more of a web server process or a database server process.

Description of Example Embodiments

Disclosed herein are systems, methods, and computer-readable media for monitoring and providing security to computer systems or hosts in a computing environment such as a data center. While complex sets of monitoring applications may be executed in each server or host of applications, knowing which applications to monitor is a challenge because each host may have numerous applications executing on the host. Accordingly, aspects of this disclosure are directed to identifying an important subset of applications among the various applications which may be executing on one or more hosts and prioritizing this subset of applications for monitoring. Such prioritization can address the challenges involved in providing security services to computing systems as the number of applications being hosted and the number of computing devices continue to grow.

According to some examples, an automated system and method can be used for identifying the functionalities for hosting important applications. Long-running processes such as a web server process or a database server process are recognized as examples of processes or applications belonging to the important subset of applications. Identifying the hosts in a data center on which such important subsets of applications are hosted allows defining the corresponding host functionalities for hosting these long-running processes. Monitoring the health/behavior of the servers or hosts which are recognized as hosting the important subset of applications such as the web server process or a database server process can be prioritized accordingly.

Figure 1:
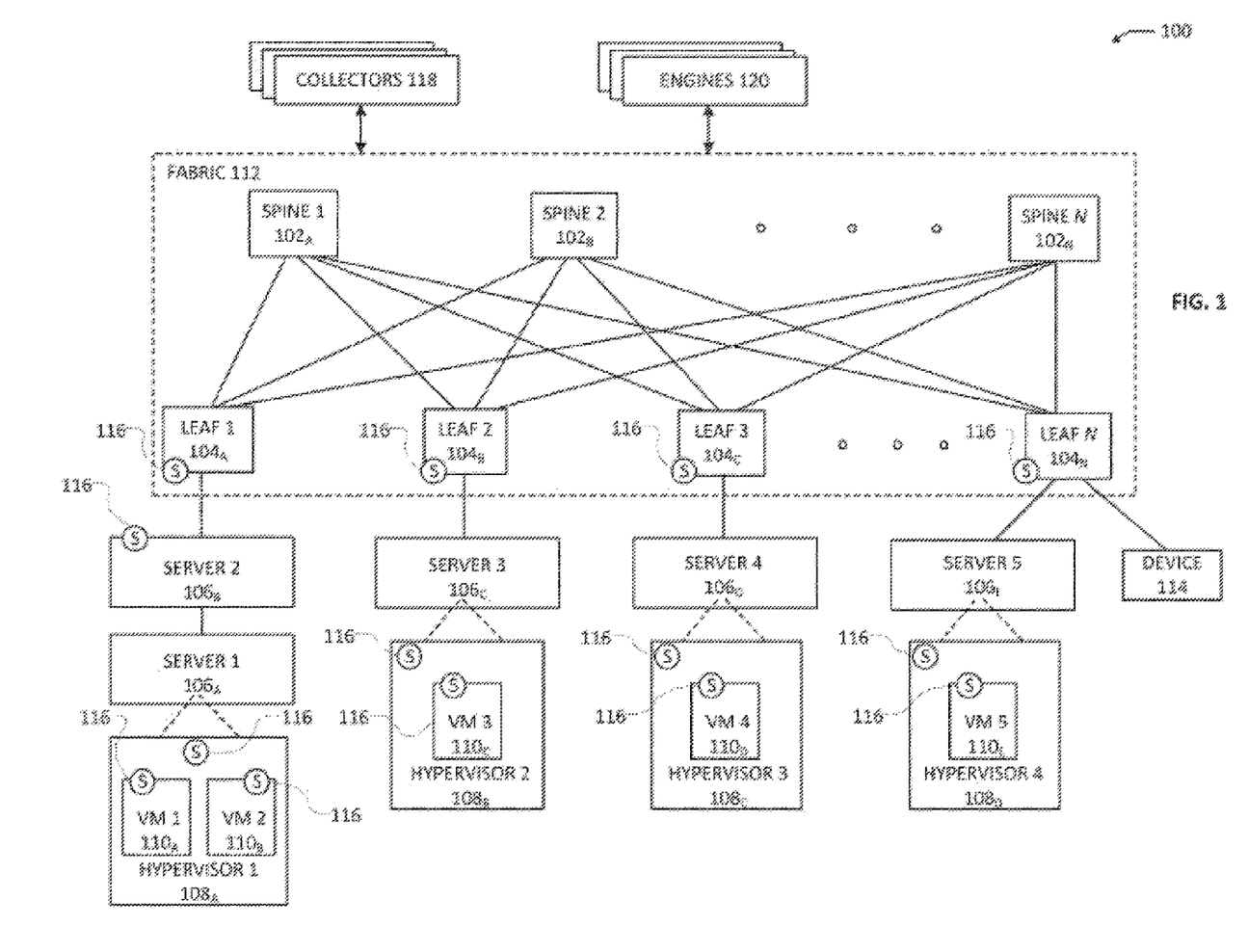
FIG. 1 illustrates a network environment in accordance with some examples.

FIG. 1 illustrates a diagram of an example network environment 100 according to aspects of this disclosure. A fabric 112 can represent the underlay (i.e., physical network) of the network environment 100. The fabric 112 can include one or more spine routers 1-N (102 A-N) (collectively "102") and one or more leaf routers 1-N (104 A-N) (collectively "104"). The leaf routers 104 can reside at the edge of the fabric 112, and can thus represent the physical network edge. The leaf routers 104 can be, for example, top-of-rack ("ToR") switches, aggregation switches, gateways, ingress and/or egress switches, provider edge devices, and/or any other type of routing or switching device.

The leaf routers 104 can be responsible for routing and/or bridging tenant or endpoint packets and applying network policies. The spine routers 102 can perform switching and routing within the fabric 112. Thus, network connectivity in the fabric 112 can flow from the spine routers 102 to the leaf routers 104, and vice versa.

The leaf routers 104 can provide servers 1-5 (106 A-E) (collectively "106"), hypervisors 1-4 (108 A-108 D) (collectively "108"), and virtual machines (VMs) 1-5 (110 A-110 E) (collectively "110") access to fabric 112. For example, the leaf routers 104 can encapsulate and decapsulate packets to and from the servers 106 in order to enable communications throughout the network environment 100. The leaf routers 104 can also connect other devices, such as a device 114, with the fabric 112. The device 114 can be any network-capable device(s) or network(s), such as a firewall, a database, a server, a collector 118 (further described below), an engine 120 (further described below), etc. The leaf routers 104 can also provide any other servers, resources, endpoints, external networks, VMs, services, tenants, or workloads with access to the fabric 112.

One or more virtual machines (VMs) 110 can be hosted by the hypervisors 108 running on the servers 106. The VMs 110 can include workloads running on a guest operating system on a respective server. The hypervisors 108 can provide a layer of software, firmware, and/or hardware that creates and runs the VMs 110. The hypervisors 108 can allow the VMs 110 to share hardware resources on the servers 106, and the hardware resources on the servers 106 to appear as multiple, separate hardware platforms. Moreover, the hypervisors 108 and the servers 106 can host one or more VMs 110. For example, a server 106A and a hypervisor 108A can host the VMs 110A-B.

In some cases, the VMs 110 and/or hypervisors 108 can be migrated to other servers 106. For example, the VM 110A can be migrated to a server 106C and a hypervisor 108B. The servers 106 can similarly be migrated to other locations in the network environment 100. For example, a server connected to a specific leaf router can be changed to connect to a different or additional leaf router. In some cases, some or all of the servers 106, hypervisors 108, and/or VMs 110 can represent a tenant space. The tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include a sensor 116 configured to capture network data, and report any portion of the captured data to a collector 118. The sensors 116 can be processes, agents, modules, drivers, or components deployed on a respective system (e.g., a host, a server, VM, hypervisor, leaf router, etc.), configured to capture network data for the respective system (e.g., data received or transmitted by the respective system), and report some or all of the captured data to the collector 118.

For example, a VM sensor can run as a process, kernel module, or kernel driver on the guest operating system installed in a VM and be configured to capture data (e.g., network and/or system data) processed (e.g., sent, received, generated, etc.) by the VM. A hypervisor sensor can run as a process, kernel module, or kernel driver on the host operating system installed at the hypervisor layer and configured to capture data (e.g., network and/or system data) processed (e.g., sent, received, generated, etc.) by the hypervisor. A host/server sensor can run as a process, kernel module, or kernel driver on the host operating system of a server and configured to capture data (e.g., network and/or system data) processed (e.g., sent, received, generated, etc.) by the host/server. In various examples discussed below, the host/server sensors can also gather information pertaining to the processes or applications executing on the host/server. A network device sensor can run as a process or component in a network device, such as the leaf routers 104, and configured to capture data (e.g., network and/or system data) processed (e.g., sent, received, generated, etc.) by the network device.

The sensors 116 can be configured to report data and/or metadata about one or more packets, flows, communications, processes, execution of applications, events, and/or activities observed to the collector 118. For example, the sensors 116 can capture network data as well as information about the system or host of the sensors 116 (e.g., where the sensors 116 are deployed). Such information can also include, for example, data or metadata of active or previously active processes of the system, metadata of files on the system, system alerts, networking information, operating system state, etc. Reported data from the sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

The collectors 118 can be one or more devices, modules, workloads and/or processes capable of receiving data from the sensors 116. The collectors 118 can thus collect reports and data from sensors 116. The collectors 118 can be deployed anywhere in the network environment 100 and/or even on remote networks capable of communicating with the network environment 100. For example, one or more collectors can be deployed within the fabric 112 or on one or more of the servers 106. One or more collectors can be deployed outside of the fabric 112 but connected to one or more leaf routers 104. The collectors 118 can be part of the servers 106 and/or separate servers or devices (e.g., the device 114). The collectors 118 can also be implemented in a cluster of servers.

The collectors 118 can be configured to collect data from the sensors 116. In addition, the collectors 118 can be implemented in one or more servers. As previously noted, the collectors 118 can include one or more collectors. Moreover, each collector can be configured to receive reported data from all sensors 116 or a subset of the sensors 116. For example, a collector can be assigned to a subset of the sensors 116 so the data received by that specific collector is limited to data from the subset of sensors.

The collectors 118 can be configured to aggregate data from all of the sensors 116 and/or a subset of sensors 116. Moreover, the collectors 118 can be configured to analyze some or all of the data reported by the sensors 116. For example, the collectors 118 can include analytics engines (e.g., engines 120) for analyzing collected data. The network environment 100 can also include separate analytics engines 120 configured to analyze the data reported to the collectors 118. For example, the engines 120 can be configured to receive collected data from the collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or any other analytics functions.

While the collectors 118 and the engines 120 are shown as separate entities, this is for illustration purposes as other configurations are also contemplated herein. For example, any of the collectors 118 and the engines 120 can be part of a same or separate entity. Moreover, any of the collector, aggregation, and analytics functions can be implemented by one entity (e.g., the collectors 118) or separately implemented by multiple entities (e.g., the engine 120 and/or the collectors 118).

Each of the sensors 116 can use a respective address (e.g., internet protocol (IP) address, port number, etc.) of their host to send information to collectors 118 and/or any other destination. Moreover, the sensors 116 can periodically send information about flows they observe to the collectors 118. The sensors 116 can be configured to report each and every flow they observe. The sensors 116 can report a list of flows that were active during a period of time (e.g., between the current time and the time of the last report). The communication channel between a sensor and a collector 118 can also create a flow in every reporting interval. Thus, the information transmitted or reported by the sensors 116 can also include information about the flow created by the communication channel.

In some examples, of the network environment 100, the servers 106A-C can run and host one or more virtual machines configured to run workloads (e.g., applications, services, processes, functions, etc.) based on hardware resources on the respective servers. For example, the virtual machines can run on guest operating systems on a virtual operating platform provided by hypervisors. In some examples, one or more of the sensors 116 can be deployed on one or more of the virtual machines as data and packet inspection agents to capture packets, flows, processes, events, traffic, and/or any data related to applications or processes being executed by or flowing through the virtual machines. Such sensors can be configured to export or report any data collected or captured to a remote entity, such as collectors 118, for example.

Figure 2:
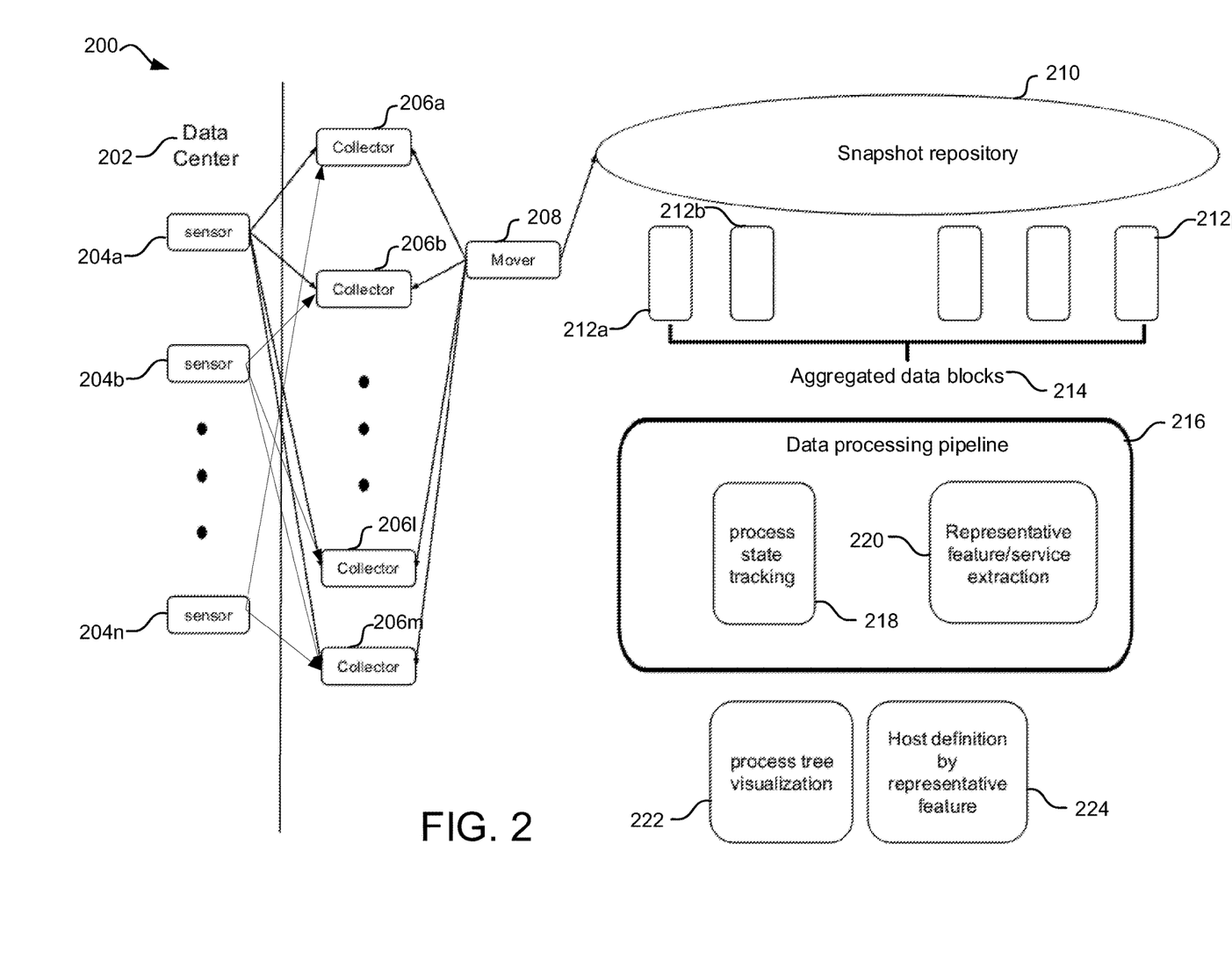
FIG. 2 a system for monitoring and analyzing processes executing on hosts of a computing environment, according to some example aspects.

FIG. 2 illustrates a system 200 configured according to the architecture of the network environment 100 described above. In an example, the system 200 can include a data center 202 (or any collection of computing systems, servers, hosts, or other). For example, the data center 202 can include a collection of two or more hosts (not explicitly shown in this view, but may be configured according to the examples of the servers discussed with reference to FIG. 1). The hosts need not be collocated but may be connected to a fabric such as the fabric 112. A set of n sensors 204*a-n* are illustrated in FIG. 2, where these sensors 204*a-n* may be configured according to the examples of the sensors 116 shown and described with reference to FIG. 1. One or more of the sensors 204*a-n* may be used to obtain information regarding applications or other processes being executed the hosts or servers of the data center 202.

In some examples, one or more of the sensors 204a-n can be used to obtain a snapshot of the processes executing on the one or more hosts. For example, the sensors 204a-n may use a software agent or other mechanism to obtain a report of the states and runtime information about all the processes executing on a host at a particular time. The snapshots may be obtained regularly or at periodic intervals, where at each capture time, a snapshot may reveal a holistic view of the processes which were executing on a host at the capture time.

Similar to the collectors 118, a set of m collectors 206a-m are shown in FIG. 2, for receiving the information from the sensors. For example, one or more of the collectors 206a-m may obtain the snapshots from the sensors 204a-n as they are reported. The number of snapshots received over a course of time from sensors deployed on various hosts may be high and continue to increase (e.g., more rapidly if the interval at which the snapshots are captured is relatively small and/or the number of hosts from which snapshots are collected continue to grow). In order to process a large and growing volume of data obtained from the snapshots, the system 200 can include mechanisms for transferring the snapshots from the collectors 206a-m to storage systems for temporary storage and subsequent handling.

In some implementations, information gathered by the collectors 206a-m can be transferred for further processing and analytics by a mover 208. The mover 208 may transfer the information from the collectors 206a-m on an on-going basis to a storage mechanism such as a snapshot repository 210. The snapshot repository 210 can be implemented as a distributed file system (E.g., Hadoop Distributed File System (HDFS)) to provide high-performance and scalable access to the information stored therein. For example, the snapshot repository 210 can distribute the data, with built-in redundancy, amongst data blocks 212a-p. In an example, information aggregated from the data blocks 214 can include snapshots obtained over a period of time (e.g., one minute) from a set of hosts under consideration. These snapshots can be analyzed, for example in the data processing pipeline 216 as follows.

In an example, snapshots from the same host are analyzed to identify processes on the host which may satisfy characteristics of important applications such as web server processes, database server processes, or others. Such characteristics can include a "long-running" characteristic. While several processes may execute for a relatively long period of time on several hosts, a long-running process which is unique to a particular host may be web server processes, database server processes, or the like, being hosted by that host. For example, database server or web server processes such as MongoDB and Apache may be installed on and hosted by a particular host or collection of hosts in the data center 202 while many hosts of the data center 202 may be execute several processes such as Microsoft office, security software, firewalls, etc. Determining the long-running processes which are unique to a host or set of hosts can lead to identifying characteristics associated with the long-running processes. Hosts or servers on which such long-running processes are hosted may be prioritized for monitoring or security in some examples.

The data processing pipeline 216 can include one or more processing stages such as a process state tracking stage 218 and a representative feature/service extraction stage 220. The following processes can be implemented in the data processing pipeline 216. In a first step, a long-running process can be identified from the snapshots (e.g., from information aggregated from the data blocks 214) based on a process satisfying one or more of the following criteria, which may be analyzed in the process state tracking stage 218.

According to a first criterion, a process may be a long-running process if an uptime or time that the process is actively running exceeds a predefined threshold. For example, the snapshots may capture a process's runtime information on a host, among other possible state information that may be obtained by the sensors. The predefined threshold may be based on runtimes which may be representative of web server or database server processes, for example. Thus, a process having a runtime which is representative of a web server or a database server process may be a candidate for a web server or a database server process or other process of high importance.

According to a second criterion, a process may be a long-running process if a process command string and file hash for the process are the same as those of another process identified as a long-running process. For example, some web server or a database server processes may execute in short bursts but repeatedly on a host or server. Thus, the runtime for such processes may not be of a continuously long duration even though these processes may be web server or a database server processes or the like. Thus, performing a file hash or other mapping/cross reference using a command string or other representative information of a process to known long-running processes can reveal if the process matches one of the known long-running processes.

According to a third criterion, a process may be a long-running process if the process appears in consecutive snapshots over a period of time. This criterion can be evaluated by determining the number of consecutive snapshots of a host which contain the same process. A process which appears in a predetermined number of consecutive snapshots obtained over a period of time from sensors/software agents on a host may be a long-running process on that host. For example, if process is common to snapshots of a host in a predefined number of the data blocks 212a-p, then according to the third criterion, the process may be a long-running process.

For processes that have been identified as long-running processed based on one or more of the above three criteria being satisfied, the long-running processes can be processed further, e.g., in the representative feature/service extraction stage 220. For example, representative features/services of the long-running processes can be extracted to evaluate whether the long-running processes may be web server or a database server processes or the like.

In some examples, one or more processes which satisfy one or more criteria for being long-running processes may nevertheless be excluded from further processing. For example, the processes which may be running on several hosts, although long-running on those hosts, may not display characteristics of being web server or a database server processes. For example, the various security monitoring software, firewalls, etc., which may be running continuously or for long periods of time on all hosts may not be web server or a database server processes or considered to be high importance for characterizing the hosts according to this disclosure. On the other hand, the long-running processes which are unique to a host or a small number of hosts may be characteristic of a web server or a database server process or the like executing on the host.

In an example, a scoring system such as a weighted term frequency-inverse document frequency (TF-IDF) technique may be used to determine which processes are unique to a host or small set of hosts and exclude processes which may be executing on several hosts. The TF-IDF is a statistical measure that evaluates how relevant an object is to a set of objects in a collection. For example, the TF-IDF may be used to evaluate how relevant a word is to a document in a collection of documents, by multiplying two metrics: how many times a word appears in a document, and the inverse document frequency of the word across a set of documents. In the example of evaluating the processes using a weighted TF-IDF, a long-running process may be evaluated for its relevance among the identified set of long-running processes. For example, if the same process is identified as a long-running process in the snapshots from several hosts, then that process may not be a long-running process corresponding to an web server or a database server process hosted by a particular server. In some examples, long-running processes are identified from the snapshots of several hosts and ranked based on a measure of their uniqueness. In some examples, weights may be assigned to correspond to the ranks, such as a higher weight being associated with a higher priority or unique/web server or a database server process and lower weights being associated with processes of lower priority. Upon being ranked, the processes identified as long-running processes representative of being web server or a database server processes can be used to define the functionalities of servers which may host these web server or a database server processes. Such servers hosting the web server or a database server processes can be prioritized for monitoring among the numerous servers in a data center.

In some examples, a process tree visualization block 222 can be used to order the hosts based on their functionalities, where a block 224 can be used to define hosts by their representative features/functionalities. For example, when the long-running processes are ranked based on analyzing the snapshots, the hosts of these long-running processes can also be correspondingly ranked.

Figure 3:
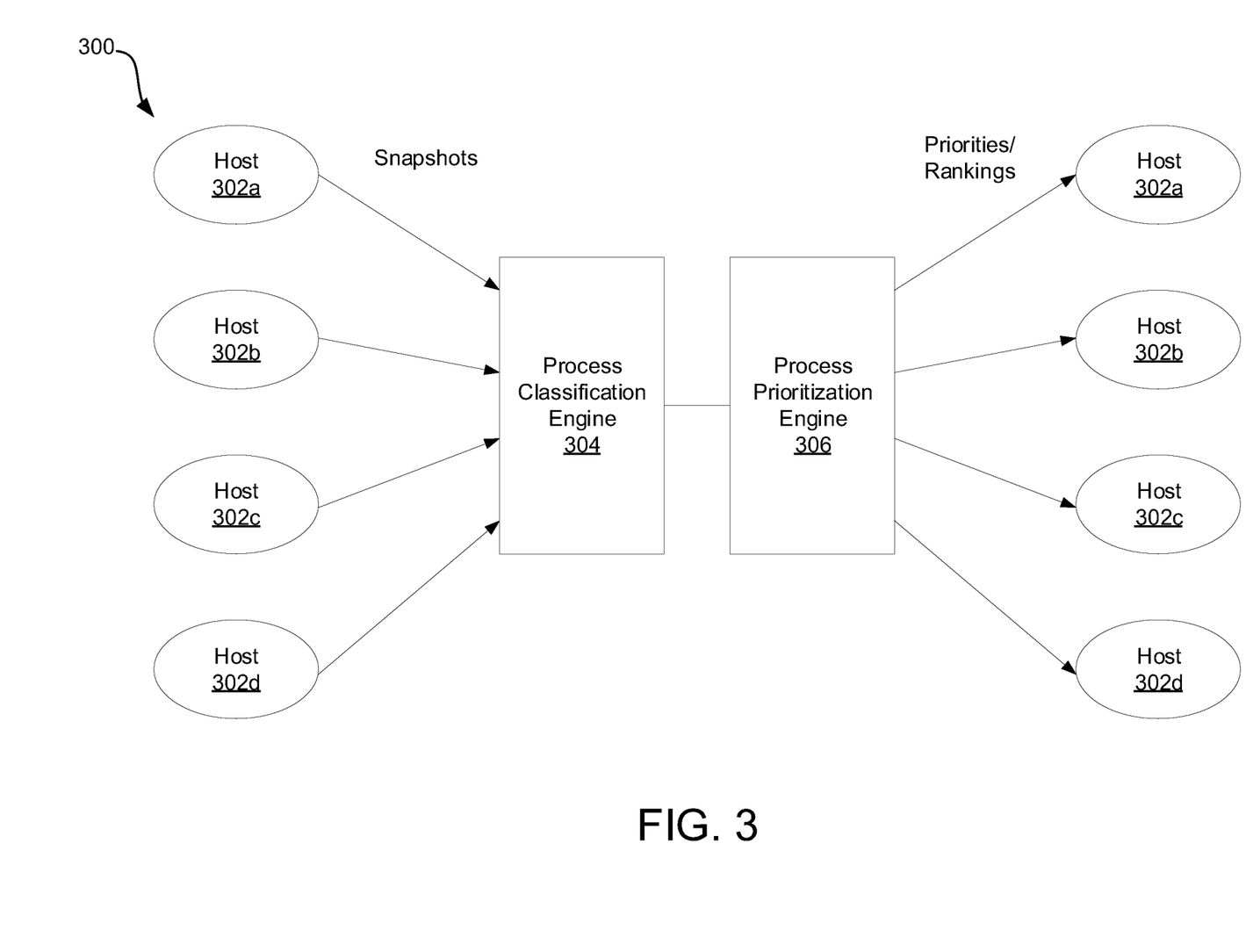
FIG. 3 illustrates an implementation of classifying and ranking processes being executed in a computing environment, in accordance with some examples.

FIG. 3 illustrates a system 300 for ranking hosts based on analyzing snapshots of processes running on the hosts. Several hosts 302a-d may be part of a data center, server farm, or other collection of computing devices. Sensors such as the sensors 116, 204a-n, or other software agents may be configured to collect periodic state information such as snapshots of processes running on the hosts 302a-d. A process classification engine 304 may be configured to implement the various aspects of the system 200, such as collectors 206a-m to collect the snapshots, mover 208 to transfer them to a snapshot repository 210, a data processing pipeline 216 to obtain information aggregated data blocks 214 containing snapshots over a period of time, and identify the long-running processes. For example, the process classification engine 304 can include mechanisms for analyzing the snapshots of the processes running on the hosts 302a-d over a period of time to identify the long-running processes based on one or more criteria such as a process having a runtime greater than a pre-specified threshold, the process displaying characteristics similar to that of known long-running processes, the process appearing in a predefined number of consecutive snapshots, etc.

A process prioritization engine 306 may analyze the long-running processes which have been identified using the above-described criteria, and classify/rank the processes. For example, the process prioritization engine 306 may use a scoring system such as the TF-IDF or other to determine the processes which are unique to certain hosts 302a-d (or a subset of hosts 302a-d) as candidates for high prioritization, while deprioritizing those processes which may be long-running but common to several or all of the hosts 302a-d. The process prioritization engine 306 can assign a high priority to processes which are unique to a host or a subset of hosts (the number of hosts in a subset may be dependent on the type of process being hosted, and can be determined based on knowledge of the number of servers/hosts which may be typically used to host certain types of web server or a database server processes or the like in a data center, for example). Correspondingly, the one or more hosts 302a-d on which such high priority processes are being hosted can be determined. Likewise, the remaining hosts on which lower priority processes are being executed can also be determined. Defining host functionalities can be based on ranking or prioritizing the processes which are being executed on certain hosts. For example, based on one or more hosts 302a-d being identified as hosts on which a web server or a database server process or the like are being hosted, those one or more hosts may be classified as having web server or a database server process hosting functionalities. Correspondingly, the hosts with web server or a database server process hosting functionalities can be prioritized for providing services such as monitoring/security in some examples.

Figure 4:
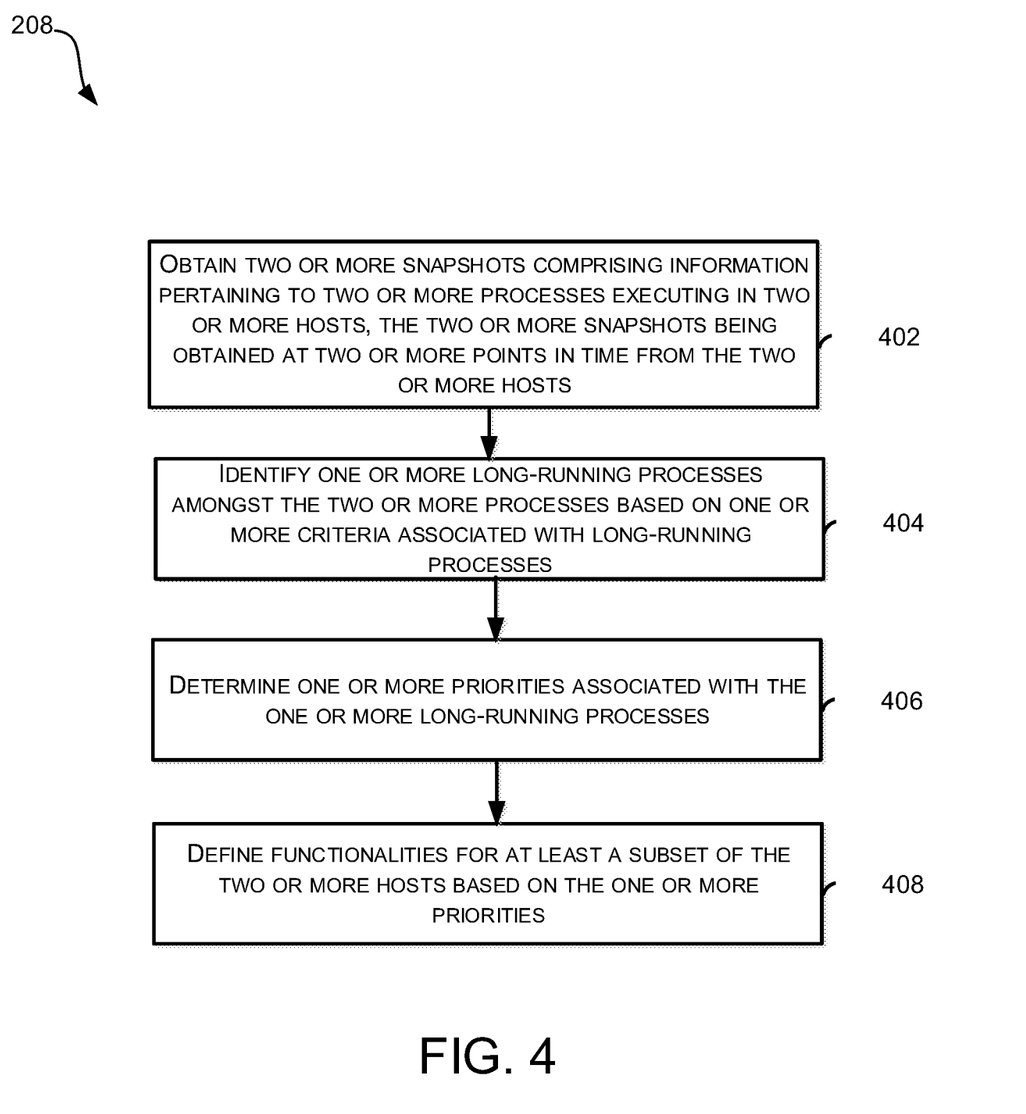
FIG. 4 illustrates a process for classifying processes and corresponding hosts in a computing environment, in accordance with some examples.

Having described example systems and concepts, the disclosure now turns to the process 400 illustrated in FIG. 4. The blocks outlined herein are examples and can be implemented in any combination thereof, including combinations that exclude, add, or modify certain steps.

At the block 402, the process 400 includes obtaining two or more snapshots comprising information pertaining to two or more processes executing in two or more hosts, the two or more snapshots being obtained at two or more points in time from the two or more hosts. For example, the sensors 204a-n may obtain snapshots from hosts (e.g., hosts 304a-n as shown in FIG. 3) of a data center 202 as shown in FIG. 2. The snapshots may be of process information executing on the hosts and collected over a period time including two or more points in time.

At the block 404, the process 400 includes identifying one or more long-running processes amongst the two or more processes based on one or more criteria associated with long-running processes. For example, the one or more criteria associated with long-running processes can include one or more of the criteria described above, such as an uptime for a process exceeding a predefined threshold, a command string and file hash for a process matching a command string and file hash of a known long-running process, or a process appearing in a predefined number of consecutive snapshots of the two or more snapshots obtained at two or more points in time from a host of the two or more host. In some examples, the data processing pipeline 216 can obtain information from the snapshot repository 210 storing the snapshots from the sensors 204a-b (forwarded by collectors 206a-m, mover 208, etc.) and identify the processes obtained from the snapshots which may satisfy one or more of these criteria. FIG. 3 illustrates a process classification engine 304 which may include the above functionalities for identifying long-running processes from snapshots obtained from hosts 302a-d in another example.

At the block 406, the process 400 includes determining one or more priorities associated with the one or more long-running processes. For example, data processing pipeline 216 or the process prioritization engine 306 can determine one or more priorities associated with the one or more long-running processes based on determining a subset of the one or more long-running processes as being unique to at least the subset of the two or more hosts (e.g., by performing a weighted term frequency-inverse document frequency (TF-IDF) analysis on the two or more snapshots). High priority may be assigned to the subset of the one or more long-running processes which are unique and low priority may be assigned to remaining long-running processes of the one or more long-running processes which do not belong to the subset of the one or more long-running processes.

At the block 408, the process 400 includes defining functionalities for at least a subset of the two or more hosts based on the one or more priorities. For example, the one or more long-running processes can include a web server process or a database server process. Hosts of such long-running processes, such as web server, database server, or in some cases, operating system (OS) processes or the like can be prioritized for monitoring or security. In some examples, resources for monitoring, security, or other may be provisioned based on the host functionalities such as hosting web server or a database server processes or the like.

Figure 5:
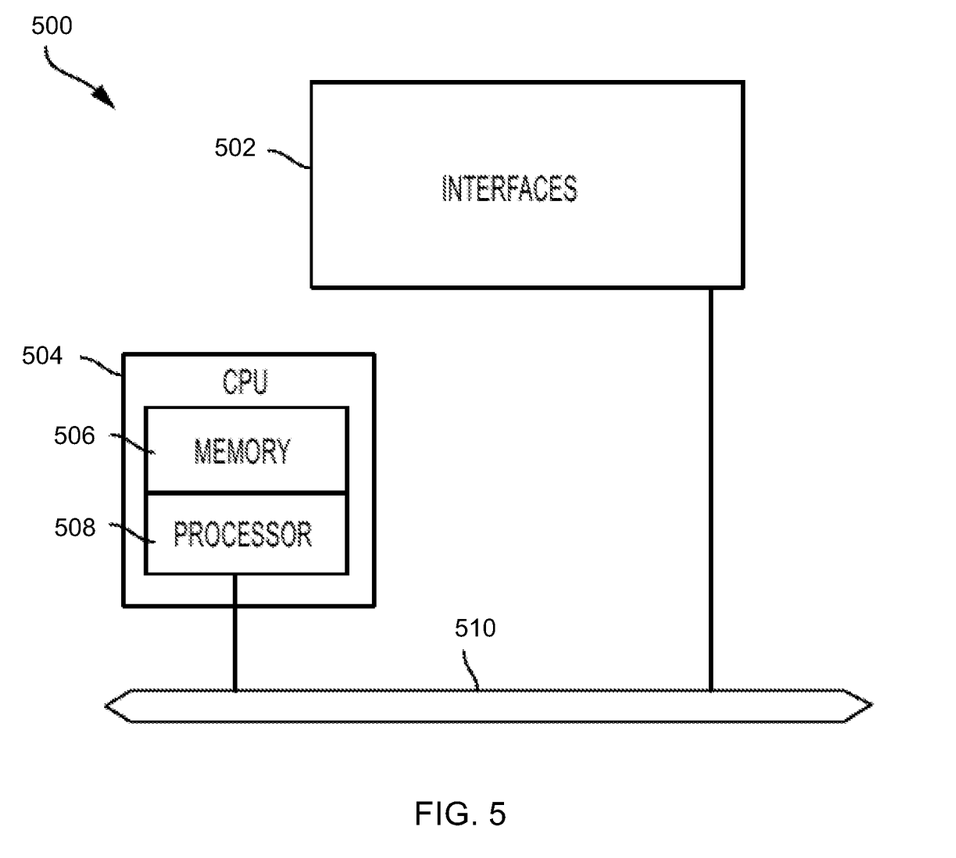
FIG. 5 illustrates an example network device in accordance with some examples.

FIG. 5 illustrates an example network device 500 suitable for implementing the aspects according to this disclosure. In some examples, the devices described with reference to system 100 and/or the network architecture may be implemented according to the configuration of the network device 500. The network device 500 includes a central processing unit (CPU) 504, interfaces 502, and a connection 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. The CPU 504 may include one or more processors 508, such as a processor from the INTEL X86 family of microprocessors. In some cases, processor 508 can be specially designed hardware for controlling the operations of the network device 500. In some cases, a memory 506 (e.g., non-volatile RAM, ROM, etc.) also forms part of the CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 504 to efficiently perform routing computations, network diagnostics, security functions, etc.

Although the system shown in FIG. 5 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 506 could also hold various software containers and virtualized execution environments and data.

The network device 500 can also include an application-specific integrated circuit (ASIC), which can be configured to perform routing and/or switching operations. The ASIC can communicate with other components in the network device 500 via the connection 510, to exchange data and signals and coordinate various types of operations by the network device 500, such as routing, switching, and/or data storage operations, for example.

Figure 6:
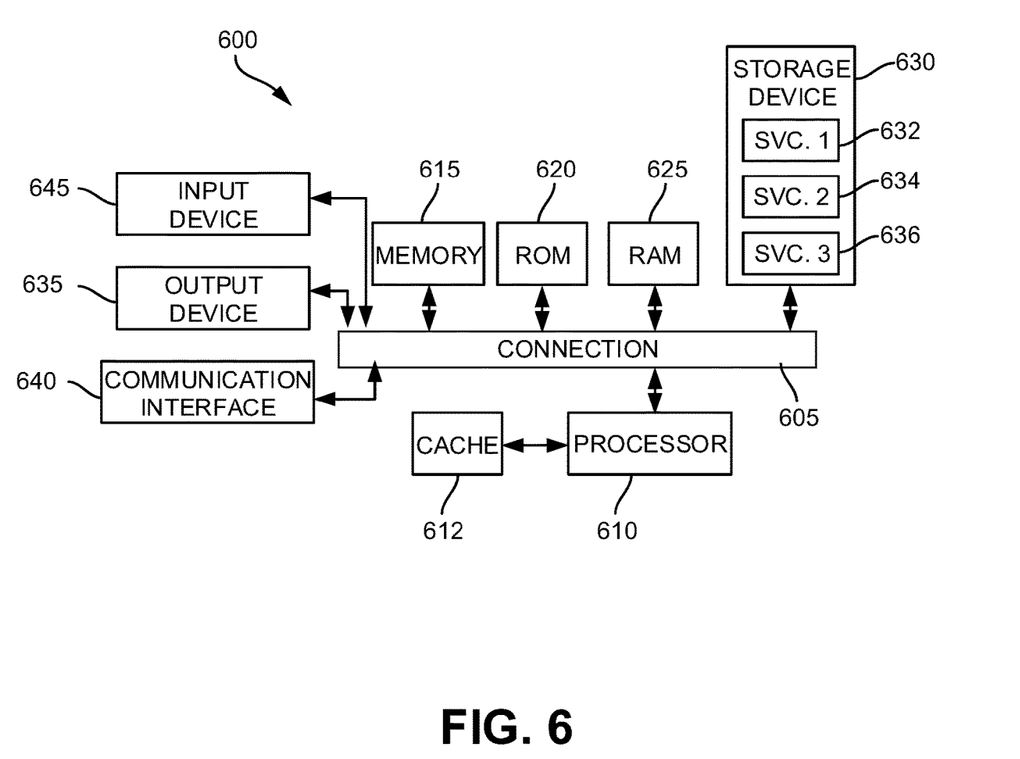
FIG. 6 illustrates an example computing device architecture, in accordance with some examples.

FIG. 6 illustrates an example computing device architecture 600 of an example computing device which can implement the various techniques described herein. The components of the computing device architecture 600 are shown in electrical communication with each other using a connection 605, such as a bus. The example computing device architecture 600 includes a processing unit (CPU or processor) 610 and a computing device connection 605 that couples various computing device components including the computing device memory 615, such as read only memory (ROM) 620 and random access memory (RAM) 625, to the processor 610.

The computing device architecture 600 can include a cache of high-speed memory connected directly with, in close proximity to, or integrated as part of the processor 610. The computing device architecture 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other computing device memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the processor design. The processor 610 may be a self-contained system, containing multiple cores or processors, a bus, memory controller, cache, etc. A multi-core processor may be symmetric or asymmetric.

To enable user interaction with the computing device architecture 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art, such as a display, projector, television, speaker device, etc. In some instances, multimodal computing devices can enable a user to provide multiple types of input to communicate with the computing device architecture 600. The communications interface 640 can generally govern and manage the user input and computing device output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof. The storage device 630 can include services 632, 634, 636 for controlling the processor 610. Other hardware or software modules are contemplated. The storage device 630 can be connected to the computing device connection 605. In one aspect, a hardware module that performs a particular function can include the software component stored in a computer-readable medium in connection with the necessary hardware components, such as the processor 610, connection 605, output device 635, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
obtaining two or more snapshots comprising information pertaining to two or more processes executing in two or more hosts, the two or more snapshots being obtained at two or more points in time from the two or more hosts;
identifying one or more long-running processes amongst the two or more processes based on one or more criteria associated with long-running processes;
determining one or more priorities associated with the one or more long-running processes;
defining functionalities for at least a subset of the two or more hosts based on the one or more priorities; and
provisioning resources for monitoring at least the subset of the two or more hosts based on defining the functionalities for at least the subset of the two or more hosts.

2. The method of claim 1, wherein the one or more criteria associated with long-running processes comprise:
an uptime for a process exceeding a predefined threshold.

3. The method of claim 1, wherein the one or more criteria associated with long-running processes comprise:
a command string and file hash for a process matching a command string and file hash of a known long-running process.

4. The method of claim 1, wherein the one or more criteria associated with long-running processes comprise:
a process appearing in a predefined number of consecutive snapshots of the two or more snapshots obtained at two or more points in time from a host of the two or more hosts.

5. The method of claim 1, wherein determining one or more priorities associated with the one or more long-running processes comprises:
determining a subset of the one or more long-running processes as being unique to at least the subset of the two or more hosts;
assigning high priority to the subset of the one or more long-running processes; and
assigning low priority to remaining long-running processes of the one or more long-running processes which do not belong to the subset of the one or more long-running processes.

6. The method of claim 5, wherein determining the subset of the one or more long-running processes as being unique to at least the subset of the two or more hosts comprises:
performing a weighted term frequency-inverse document frequency (TF-IDF) analysis on the two or more snapshots.

7. The method of claim 1, wherein the one or more long-running processes comprise one or more of a web server process or a database server process.

8. A system, comprising:
one or more processors; and
a non-transitory computer-readable storage medium containing instructions which, when executed on the one or more processors, cause the one or more processors to perform operations including:
obtaining two or more snapshots comprising information pertaining to two or more processes executing in two or more hosts, the two or more snapshots being obtained at two or more points in time from the two or more hosts;
identifying one or more long-running processes amongst the two or more processes based on one or more criteria associated with long-running processes;
determining one or more priorities associated with the one or more long-running processes; and
defining functionalities for at least a subset of the two or more hosts based on the one or more priorities; and
provisioning resources for monitoring at least the subset of the two or more hosts based on defining the functionalities for at least the subset of the two or more hosts.

9. The system of claim 8, wherein the one or more criteria associated with long-running processes comprise:
an uptime for a process exceeding a predefined threshold.

10. The system of claim 8, wherein the one or more criteria associated with long-running processes comprise:
a command string and file hash for a process matching a command string and file hash of a known long-running process.

11. The system of claim 8, wherein the one or more criteria associated with long-running processes comprise:
a process appearing in a predefined number of consecutive snapshots of the two or more snapshots obtained at two or more points in time from a host of the two or more hosts.

12. The system of claim 8, wherein determining one or more priorities associated with the one or more long-running processes comprises:
determining a subset of the one or more long-running processes as being unique to at least the subset of the two or more hosts;
assigning high priority to the subset of the one or more long-running processes; and
assigning low priority to remaining long-running processes of the one or more long-running processes which do not belong to the subset of the one or more long-running processes.

13. The system of claim 12, wherein determining the subset of the one or more long-running processes as being unique to at least the subset of the two or more hosts comprises:
performing a weighted term frequency-inverse document frequency (TF-IDF) analysis on the two or more snapshots.

14. The system of claim 8, wherein the one or more long-running processes comprise one or more of a web server process or a database server process.

15. A non-transitory machine-readable storage medium, including instructions configured to cause a data processing apparatus to perform operations including:
obtaining two or more snapshots comprising information pertaining to two or more processes executing in two or more hosts, the two or more snapshots being obtained at two or more points in time from the two or more hosts;
identifying one or more long-running processes amongst the two or more processes based on one or more criteria associated with long-running processes;
determining one or more priorities associated with the one or more long-running processes;
defining functionalities for at least a subset of the two or more hosts based on the one or more priorities; and
provisioning resources for monitoring at least the subset of the two or more hosts based on defining the functionalities for at least the subset of the two or more hosts.

16. The non-transitory machine-readable storage medium of claim 15, wherein the one or more criteria associated with long-running processes comprise:
an uptime for a process exceeding a predefined threshold.

17. The non-transitory machine-readable storage medium of claim 15, wherein determining one or more priorities associated with the one or more long-running processes comprises:
determining a subset of the one or more long-running processes as being unique to at least the subset of the two or more hosts;
assigning high priority to the subset of the one or more long-running processes; and
assigning low priority to remaining long-running processes of the one or more long-running processes which do not belong to the subset of the one or more long-running processes.

18. The non-transitory machine-readable storage medium of claim 15, wherein the one or more long-running processes comprise one or more of a web server process or a database server process.

19. The non-transitory machine-readable storage medium of claim 15, wherein the one or more criteria associated with long-running processes comprise
a command string and file hash for a process matching a command string and file hash of a known long-running process.

20. The non-transitory machine-readable storage medium of claim 15, wherein the one or more criteria associated with long-running processes comprise
a process appearing in a predefined number of consecutive snapshots of the two or more snapshots obtained at two or more points in time from a host of the two or more hosts.

* * * * *